United States Patent
Terauchi

(10) Patent No.: US 9,812,924 B2
(45) Date of Patent: Nov. 7, 2017

(54) MOTOR ASSEMBLY FOR AN ELECTRIC POWER STEERING ASSEMBLY

(71) Applicant: STEERING SOLUTIONS IP HOLDING CORPORATION, Saginaw, MI (US)

(72) Inventor: Katsunori Terauchi, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 426 days.

(21) Appl. No.: 14/541,417

(22) Filed: Nov. 14, 2014

(65) Prior Publication Data
US 2016/0141936 A1    May 19, 2016

(51) Int. Cl.
| | |
|---|---|
| H02K 7/116 | (2006.01) |
| H02K 7/00 | (2006.01) |
| H02K 7/108 | (2006.01) |
| H02K 15/16 | (2006.01) |

(52) U.S. Cl.
CPC ........... *H02K 7/1166* (2013.01); *H02K 7/003* (2013.01); *H02K 7/108* (2013.01); *H02K 15/16* (2013.01)

(58) Field of Classification Search
CPC ...... H02K 7/1166; H02K 7/003; H02K 7/108; H02K 7/081; H02K 15/16
USPC .......................................................... 310/51
See application file for complete search history.

(56) References Cited

U.S. PATENT DOCUMENTS

| | | | | | |
|---|---|---|---|---|---|
| 5,994,807 | A | * | 11/1999 | Coles | H02K 7/1166 310/83 |
| 6,357,313 | B1 | * | 3/2002 | Appleyard | H02K 7/081 74/425 |
| 2002/0189892 | A1 | * | 12/2002 | Appleyard | H02K 7/081 180/444 |
| 2004/0065163 | A1 | | 4/2004 | Takahashi et al. | |
| 2005/0115350 | A1 | * | 6/2005 | Ohashi | H02K 7/081 74/425 |
| 2007/0131475 | A1 | * | 6/2007 | Matsubara | H02K 7/003 180/443 |

(Continued)

FOREIGN PATENT DOCUMENTS

| | | |
|---|---|---|
| EP | 1560314 A1 | 8/2005 |
| EP | 1681757 A1 | 7/2006 |

(Continued)

OTHER PUBLICATIONS

Extended European search report for related European Application No. 15192274.7, dated May 11, 2016, pp. 9.

(Continued)

*Primary Examiner* — Michael Andrews
(74) *Attorney, Agent, or Firm* — Cantor Colburn LLP

(57) ABSTRACT

In one aspect of the invention, a motor assembly for an electric power steering assembly is provided. The motor assembly includes a motor housing, a stator, and a hollow rotor defining an inner cavity, the rotor configured for rotational movement within the motor housing. The motor assembly further includes a worm shaft having a first end and a second end, and a motor coupling positioned within the inner cavity and coupled to the rotor for rotational movement therewith. The worm shaft first end is coupled to the motor coupling for rotational movement therewith.

15 Claims, 3 Drawing Sheets

(56) References Cited

U.S. PATENT DOCUMENTS

| | | |
|---|---|---|
| 2008/0093942 A1 | 4/2008 | Huang |
| 2014/0265738 A1 | 9/2014 | Anderson et al. |

FOREIGN PATENT DOCUMENTS

| | | |
|---|---|---|
| GB | 2435912 A | 9/2007 |
| WO | 2012041693 A1 | 4/2012 |

OTHER PUBLICATIONS

Photograph of an EPS Motor of a 2006 Toyota RAV4.
Photograph of an EPS Motor of a 2011 Fiat Bravo.

* cited by examiner

MOTOR ASSEMBLY FOR AN ELECTRIC POWER STEERING ASSEMBLY

FIELD OF THE INVENTION

The subject invention relates to motors, and more particularly, to a motor for an electric power steering assembly.

BACKGROUND OF THE INVENTION

As packaging requirements in vehicles becomes stricter, it may be necessary to provide a product in a smaller area or volume. In packaging of some electric power steering (EPS) assemblies, the motor axis length is a significant factor when determining if the product design will fit in the vehicle. Accordingly, it is desirable to reduce the motor axis length in the packaging.

SUMMARY OF THE INVENTION

In one aspect of the invention, a motor assembly for an electric power steering assembly is provided. The motor assembly includes a motor housing, a stator, and a hollow rotor defining an inner cavity, the rotor configured for rotational movement within the motor housing. The motor assembly further includes a worm shaft having a first end and a second end, and a motor coupling positioned within the inner cavity and coupled to the rotor for rotational movement therewith. The worm shaft first end is coupled to the motor coupling for rotational movement therewith.

In another aspect of the invention, a method of assembling a motor assembly for an electric power steering assembly. The method includes providing a motor having a hollow rotor defining an inner cavity, the rotor configured for rotational movement within the motor housing, providing a worm shaft having a first end and a second end, and providing a motor coupling. The method further includes positioning the motor coupling within the inner cavity and coupling the motor coupling to the rotor for rotational movement therewith, and coupling the worm shaft first end to the motor coupling for rotational movement therewith.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Described herein are systems and methods for motor assemblies of electric power steering (EPS) assemblies. The motor assemblies include a "hollow" rotor without a motor shaft. An input shaft or reduction mechanism such as a worm shaft is coupled to the motor to provide rotary motion to the worm shaft unlike some known EPS assemblies, which utilize a motor shaft and an intermediary coupling outside of the motor housing to transmit torque to the worm shaft.

Figure 1:
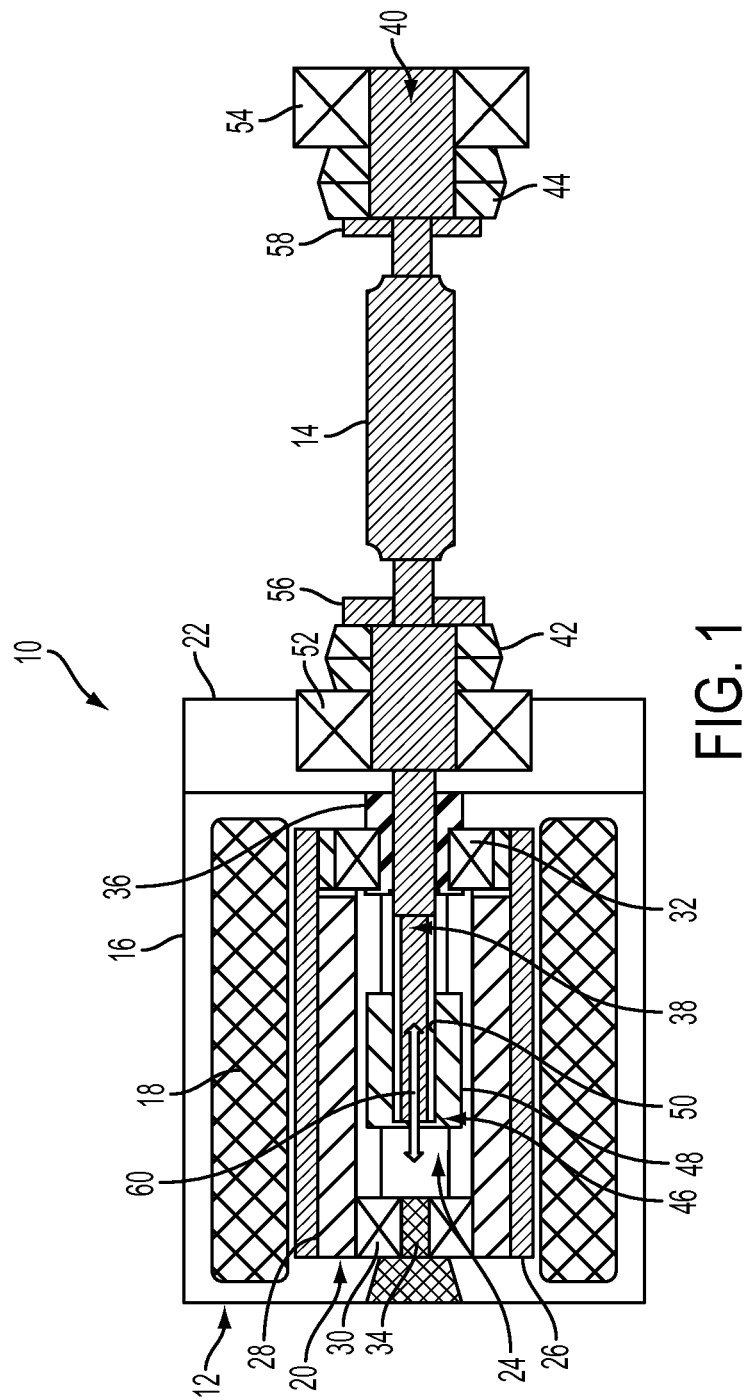
FIG. 1 is a schematic view of an exemplary motor assembly of the invention.

Referring now to the Figures, where the invention will be described with reference to specific embodiments, without limiting same, FIG. 1 illustrates an exemplary motor assembly 10 for an EPS assembly (not shown). However, motor assembly 10 may be used in other suitable assemblies. In the exemplary embodiment, motor assembly 10 generally includes a motor 12 and a worm shaft 14.

Motor 12 generally includes a housing 16, a stator 18, a hollow rotor 20, and a motor end cover 22. Rotor 20 defines an inner space or cavity 24 and includes one or more magnets 26 coupled to a rotor outer surface 28. Rotor 20 is rotatably supported by a first bearing 30 at a first end of motor housing 16 and a second bearing 32 at a second opposite end of motor housing 16. In the exemplary embodiment, first bearing 30 is coupled to a pivot 34, which is part of motor housing 16, and second bearing 32 is coupled to a pivot 36, which, in the embodiment shown, is part of motor end cover 22. Rotor 20 rotates within housing 16 when an electrical current is provided to stator 18.

Worm shaft 14 includes a first end 38, a second end 40, and dampers or isolators 42 and 44. A motor coupling 46 is oriented in rotor inner cavity 24 and includes an outer surface 48 coupled to rotor 20 for rotational movement therewith. Worm shaft first end 38 extends within motor housing 16 and is coupled to an inner surface 50 of motor coupling 46 in a suitable manner. As shown, motor coupling inner surface 50 and shaft first end 38 are coupled by a splined connection. However, other coupling arrangements may be used such as serrations, keys, etc. Worm shaft 14 is rotatably supported by a first bearing 52 and a second bearing 54. First bearing 52 is coupled to motor end cover 22, and second bearing 54 is coupled to an additional EPS component, for example, a worm shaft housing (not shown).

In the exemplary embodiment, isolator 42 is oriented on shaft 14 between motor end cover 22 and a worm shaft flange 56, and isolator 44 is oriented on shaft 14 between bearing 54 and a worm shaft flange 58. Isolators 42 and 44 are configured to provide axial preload and damping of axial motion of worm shaft 14 when the shaft is loaded (e.g., during initial preloading during assembly). Further, motor coupling 46 is axially translatable or slidable within rotor cavity 24 during axial loading (e.g., to absorb worm shaft stroke), as shown by arrows 60. As such, a portion of worm shaft 14 is oriented inside motor 12 and is rotatably coupled thereto. Accordingly, assembly 10 does not include a motor shaft or intermediary coupling outside motor housing 16 to couple the motor shaft and worm shaft first end 38.

Figure 2:
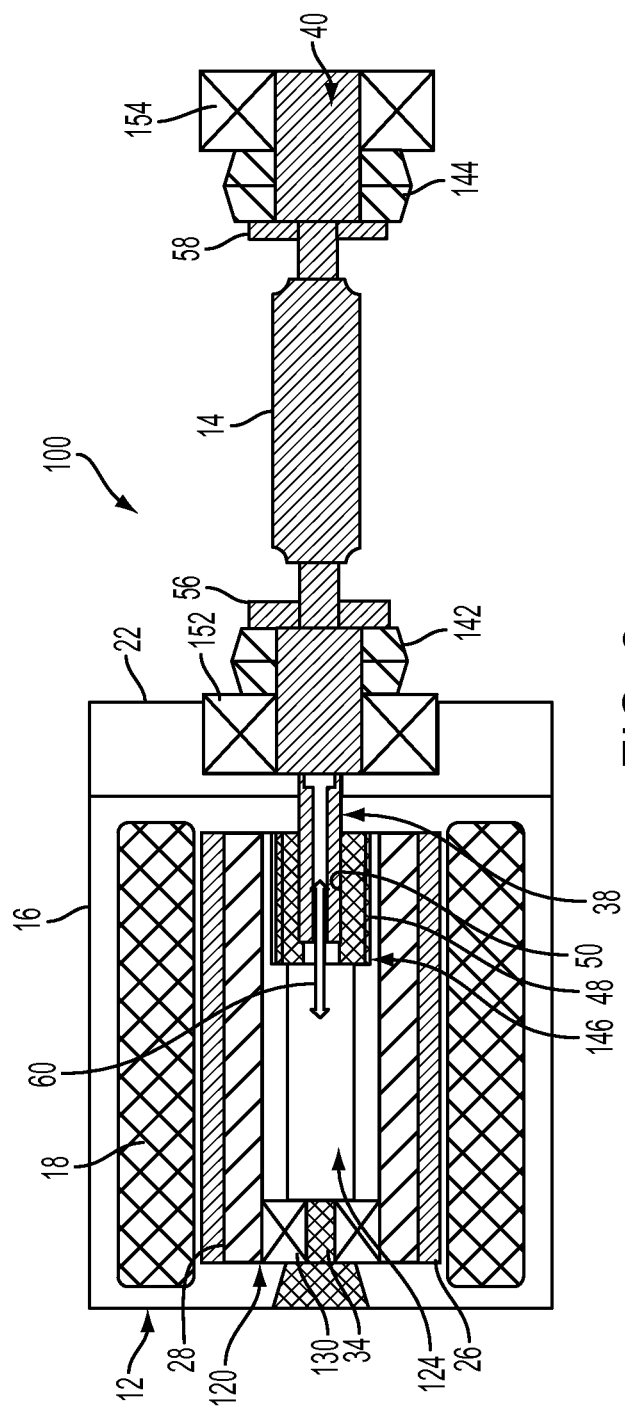
FIG. 2 is a schematic view of another exemplary motor assembly of the invention.

FIG. 2 illustrates a motor assembly 100 that is similar to motor assembly 10. Like elements are identified with identical numbers to FIG. 1. The embodiment of FIG. 2 differs from FIG. 1 in that it only includes three bearings 130, 152, and 154. In this embodiment, motor coupling 146 is oriented in inner cavity 124 at a second opposite end from bearing 130 to rotatably support rotor 120. Thus, motor coupling 146 supports rotation of rotor 120 and performs the bearing function provided by second bearing 32 of the embodiment of FIG. 1.

Figure 3:
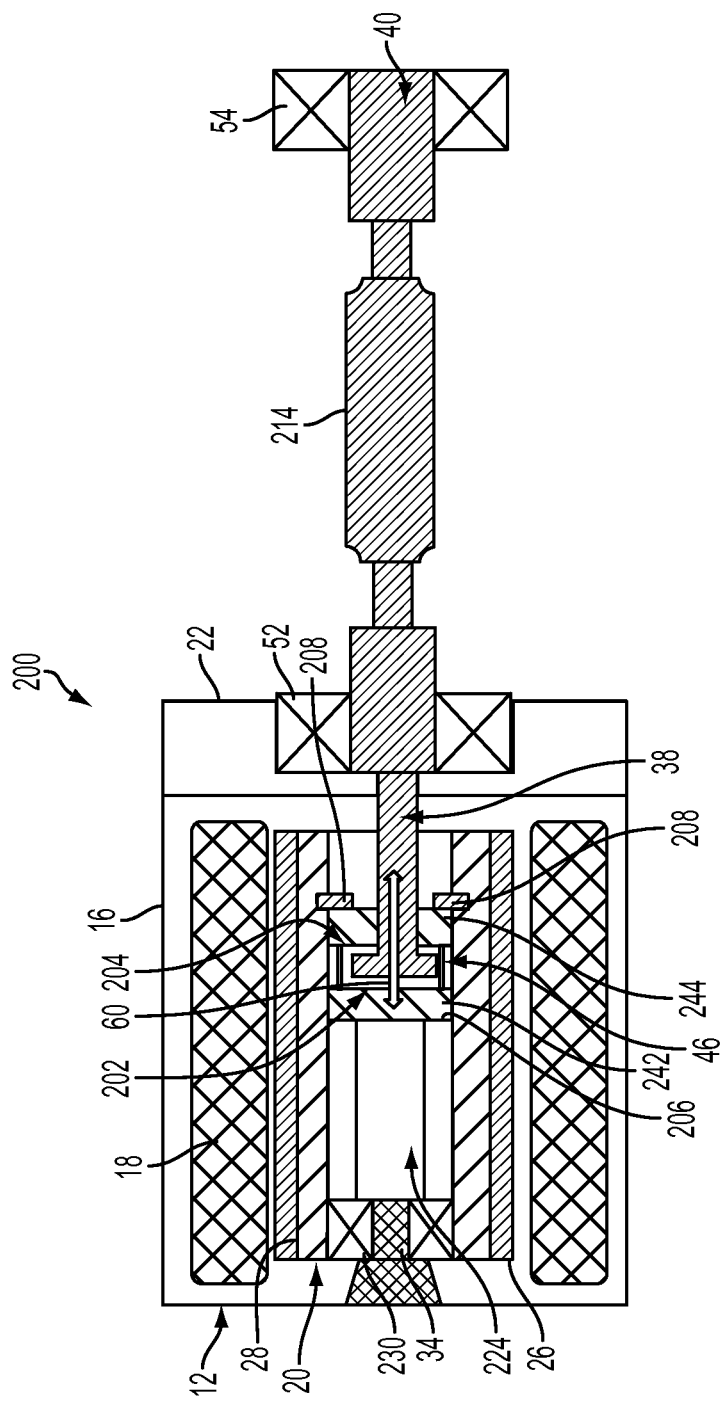
FIG. 3 is a schematic view of yet another exemplary motor assembly of the invention.

FIG. 3 illustrates a motor assembly 200 that is similar to motor assembly 100 of FIG. 2. However, isolators 242, 244 are oriented within inner cavity 224. As shown, isolator 242 is oriented on a first side 202 of motor coupling 246, and isolator 244 is oriented on shaft 214 on a second side 204 of motor coupling 246, which is opposite of first side 202. Isolator 242 is positioned between motor coupling 246 and a rotor inner wall 206, and isolator 244 is positioned between motor coupling 246 and a support 208. As such, the damping function performed by isolators 242 and 244 is located in the interior of rotor 20 and integrated into the connection between the rotor 20 and shaft 14.

A method of assembling motor assembly 10 includes providing motor 12 with hollow rotor 20 and providing worm shaft 14. Motor coupling 46 is oriented within rotor inner cavity 24 by press fitting, and worm shaft first end 38 is coupled to motor coupling 46 by press fitting. Alternatively, motor coupling 46 may be oriented within cavity 24 by overmolding, sliding/serrated interface, etc. However, rotor 20, motor coupling 46, and shaft 14 may be coupled in any manner that enables assembly 10 to function as described herein.

In one embodiment, a single bearing 130, 230 is provided in motor 12 to rotatably support rotor 120, 220 (FIGS. 2 and 3). In another embodiment, two bearings 30, 32 are provided in motor 12 to rotatably support rotor 20 (FIG. 1). In one embodiment, isolator 42, 142 is oriented between motor end cover 22 and shaft flange 56, and isolator 44, 144 is oriented between shaft flange 58 and bearing 54 (FIGS. 1 and 2). In another embodiment, isolator 242 is oriented within inner cavity 224 on one side 202 of motor coupling 246, and isolator 244 is oriented within inner cavity 224 on the other side 204 of motor coupling 246 (FIG. 3).

Described herein are systems and methods for motor assemblies of electric power steering (EPS) assemblies. The motor assemblies include a hollow rotor and a worm shaft extending into the rotor. The worm shaft is rotatably coupled to the hollow rotor, thereby obviating the need for a motor shaft. Without a motor shaft, at least a portion of the worm shaft can be positioned within the motor, thereby reducing the motor axis length and providing a more compact package for the EPS assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor assembly for an electric power steering assembly, the motor assembly comprising:
    a motor housing;
    a stator;
    a hollow rotor defining an inner cavity, the rotor configured for rotational movement within the motor housing;
    a worm shaft having a first end and a second end;
    a motor coupling positioned within the inner cavity and coupled to the rotor for rotational movement therewith, the worm shaft first end coupled to the motor coupling for rotational movement therewith; and
    at least one damper coupled to the worm shaft, wherein the at least one damper is oriented within the rotor inner cavity.

2. The motor assembly of claim 1, further comprising a bearing rotatably supporting the rotor at a first end of the motor housing.

3. The motor assembly of claim 2, further comprising a second bearing rotatably supporting the rotor at a second end of the motor housing opposite the first end of the motor housing.

4. The motor assembly of claim 2, wherein the motor coupling supports rotation of the rotor at a second end of the motor housing opposite the first end of the motor housing.

5. The motor assembly of claim 1, further comprising a first bearing and a second bearing rotatably supporting the worm shaft.

6. The motor assembly of claim 5, further comprising a motor end cover coupled to the motor housing, wherein the first bearing is coupled to the motor end cover.

7. The motor assembly of claim 1, wherein the motor does not include a motor shaft coupled to the rotor.

8. The motor assembly of claim 1, wherein the motor coupling is slidably coupled to the rotor and/or the worm shaft first end to facilitate slidable movement of the motor coupling and/or the worm shaft in an axial direction within the rotor inner cavity.

9. A method of assembling a motor assembly for an electric power steering assembly, the method comprising:
    providing a motor having a hollow rotor defining an inner cavity, the rotor configured for rotational movement within a motor housing;
    providing a worm shaft having a first end and a second end;
    providing a motor coupling;
    positioning the motor coupling within the inner cavity and coupling the motor coupling to the rotor for rotational movement therewith;
    coupling the worm shaft first end to the motor coupling for rotational movement therewith;
    coupling at least one damper to the worm shaft; and
    orienting the at least one damper within the rotor inner cavity.

10. The method of claim 9, further comprising providing the motor with a bearing to rotatably support the rotor at a first end of the motor housing.

11. The method of claim 10, further comprising providing the motor with a second bearing to rotatably support the rotor at a second end of the motor housing opposite the first end of the motor housing.

12. The method of claim 10, further comprising supporting, with the motor coupling, the rotation of the rotor at a second end of the motor housing opposite the first end of the motor housing.

13. The method of claim 9, further comprising providing a first bearing and a second bearing to rotatably support the worm shaft.

14. The method of claim 13, further comprising coupling the first bearing to a motor end cover and coupling the motor end cover to the motor housing.

15. The method of claim 9, further comprising slidably coupling the motor coupling to the rotor and/or the worm shaft first end to facilitate slidable movement of the motor coupling and/or the worm shaft in an axial direction within the rotor inner cavity.

\* \* \* \* \*